Patented July 24, 1951

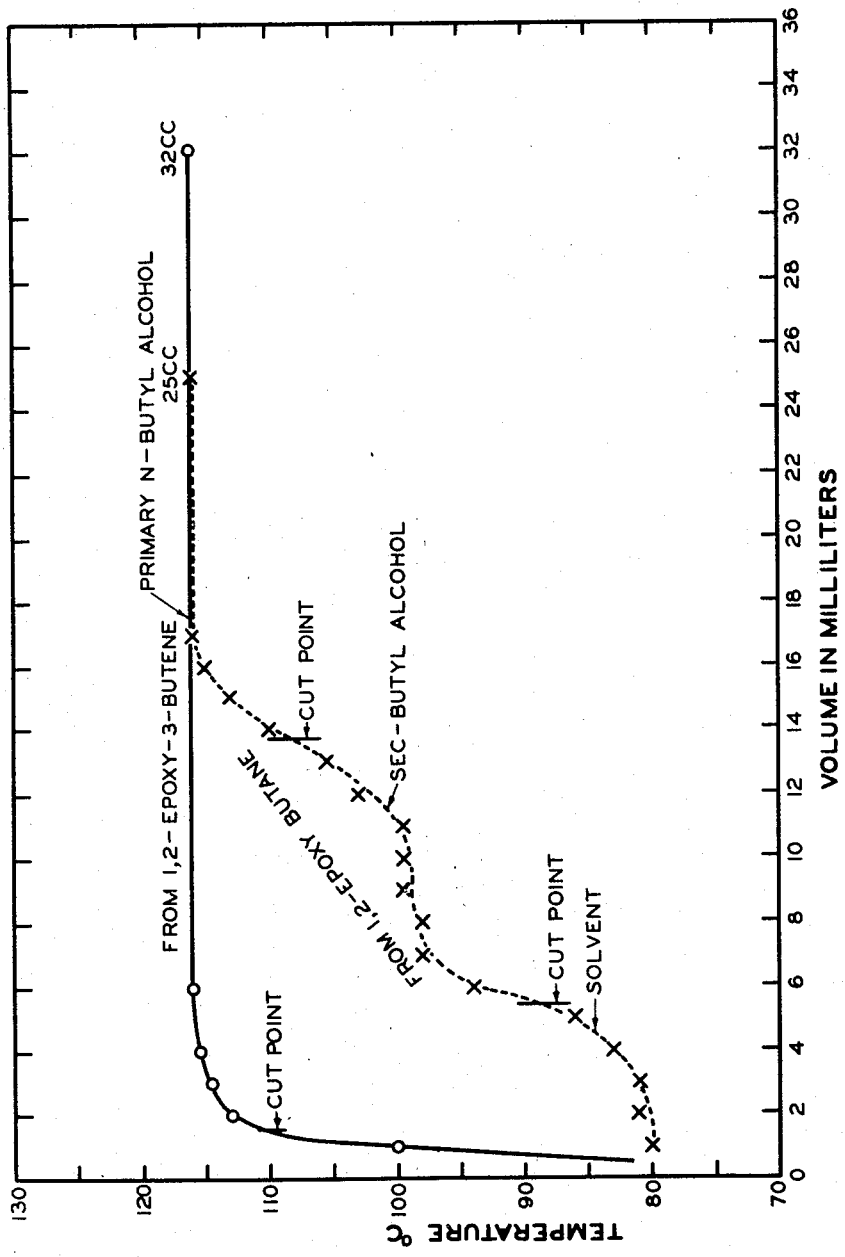

2,561,984

UNITED STATES PATENT OFFICE 2,561,984

PRODUCTION OF PRIMARY ALCOHOLS AND ALDEHYDES

John C. Hillyer and James T. Edmonds, Jr., Bartlesville, Okla., assignors to Phillips Petroleum Company, a corporation of Delaware Application April 25, 1949, Serial No. 89,549

10 Claims. (Cl. 260—598)

1

This invention relates to a process for the production of primary alcohols and/or their corresponding aldehydes. Certain specific aspects of this invention relate to the production of primary saturated alcohols and their corresponding saturated aldehydes from 1,2-epoxy-3-olefins. In some embodiments, our invention relates to the manufacture of saturated primary alcohols and their corresponding saturated aldehydes by the formation of unsaturated epoxy compounds from conjugated diolefins and the selective hydrogenation thereof.

Saturated primary alcohols of 4 or more carbon atoms per molecule have numerous uses in chemical industry. Typical of these are their utilization as solvents or as starting materials for the synthesis of valuable organic chemicals, pharmaceuticals, and the like. Heretofore, one of the principal sources of primary alcohols containing 4 to 5 carbon atoms to the molecule has been from the action of certain bacteria on starches. Obviously, such processes are time consuming, and, furthermore, they involve numerous difficulties such as the maintenance of suitable environment for bacterial growth, laborious separations, and the like. Also fluctuations in the supply of starting materials introduce serious economic problems.

Other sources of primary alcohols lie in the reduction of fatty acids obtained from animal and vegetable oils, however, the alcohols obtained in this manner generally comprise those containing an even number of carbon atoms only. Laborious and expensive processes are required for the production of such alcohols. Further complications which aid in increasing their cost are economic factors, such as supplies of starting materials.

An object of this invention is the manufacture of saturated primary alcohols.

Another object is the manufacture of saturated primary alcohols and their corresponding aldehydes by a process of selective hydrogenation.

Still another object of this invention is the production of saturated primary alcohols and/or their corresponding aldehydes by selective hydrogenation of 1,2-epoxy-3-olefins.

Another object is the production of saturated primary alcohols and their corresponding aldehydes from conjugated diolefins.

2

Another object is the manufacture of saturated primary alcohols from 1,2-epoxy-3-olefins, derived from conjugated diolefins, utilizing nickel hydrogenation catalysts.

Another object of this invention is the production of saturated primary alcohols without the formation of any secondary alcohols.

Other objects and advantages of this invention will be apparent to one skilled in the art from the accompanying disclosure and discussion.

We have discovered that 1,2-epoxy-3-olefins, which may be considered derivatives of conjugated diolefins and which may be advantageously prepared from conjugated diolefins, may be hydrogenated in the presence of a suitable hydrogenation catalyst to provide the corresponding saturated primary alcohol as essentially the sole alcohol product. In some cases, however, depending on the particular catalyst used and/or the conditions, the hydrogenation may go only so far as to produce the corresponding saturated aldehyde, or a mixture of the primary alcohol and aldehyde.

A suitable conjugated diolefin, for example butadiene, isoprene, piperylene, etc., or in general a conjugated diolefin as represented in Formula 1 below, may be converted to the corresponding 1,2-epoxy-3-olefin by admixing same with carbon dioxide and contacting this admixture with a solution of calcium hypochlorite. The effluent from this reaction is then filtered to remove calcium carbonate, saturated with sodium chloride, and extracted with ether. The product of this reaction which is a 1-halo-2-hydroxy-3-olefin is then contacted with an alkali metal hydroxide and agitated for a suitable length of time. The product of this reaction is then separated and the 1,2-epoxy-3-olefin recovered therefrom. A more detailed disclosure of this procedure is given in the following paragraph.

Butadiene and carbon dioxide are admixed in a ratio of 6:1 and then contacted with a solution containing 3.5 weight per cent calcium hypochlorite. These materials are contacted for a period of 2 hours at a temperature of 32° F. After the 2 hour contact period the reaction is complete as indicated by the disappearance of the oxidizing action of the hypochlorite. The reaction effluent is then filtered to remove the residual calcium carbonate. Following filtration, the filtrate is saturated with sodium chloride to give 1-chloro-3-butene-2-ol and then extracted with ether. The extract is vacuum distilled and the product, 1-chloro-3-butene-2-ol, boiling between 150 and 155° F., is recovered. The product material is then reacted with a solution containing 50 mol per cent of sodium hydroxide in a mol ratio of 1:1.5 at a temperature between 235 and 275° F. for a period of 1 hour. The product is continuously removed overhead at a temperature between 140 and 155° F. When the reaction rate diminishes, which may be noted by the reduction in amount of product, additional sodium hydroxide in an amount of 0.5 mol is added in small increments. On completion of the reaction, the product is treated with sodium chloride after which the upper organic layer is separately dried over calcium chloride, and fractionally distilled. Butadiene monoxide, or as it may be called, 1,2-epoxy-3-butene, boiling between 150 and 160° F. and having a refractive index $N_{20}^D$ of 1.4162, is recovered.

We have further discovered that an epoxy-olefin of the following general Formula 2, and for which one method of preparation is given above, may be hydrogenated over a suitable catalyst, giving as a product the corresponding saturated primary alcohol or aldehyde of the epoxy-olefin. The character of the product, i. e., whether it will be alcohol or adehyde, apparently depends upon the activity of the hydrogenation cataysyt used, howover, in any case either the saturated primary alcohol or the corresponding saturated aldehyde will be the product and not a secondary alcohol or ketone.

It is within the scope of this invention to produce the 1,2-epoxy-3-olefin by a process other than that discussed hereinabove. However, it is necessary that the oxygen be attached to the 1,2-carbons and that the following double bond be between the third and fourth carbon atoms, thus making it a derivative of a conjugated diolefin. The following formulae will set out the structure and chemical composition of conjugated diolefins and corresponding 1,2-epoxy-3-olefins applicable for treatment in accordance with our invention to produce the corresponding saturated primary alcohols.

(1) 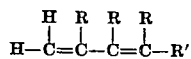

(2) 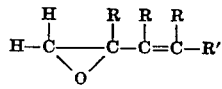

In the above formulae each R and the R' may be a hydrogen or an alkyl, aryl, aralkyl, alkenyl, cycloalkyl, or cycloalkenyl group. In addition any R may contain as many as 8 carbon atoms and R' may contain as many as 20 carbon atoms, however, the total number of carbon atoms in the molecule should not exceed about 24. It is to be understood that the named groups may be either unsubstituted or may be substituted with radicals which do not interfere with the reactions, such as hydroxyl or amine radicals. By way of example, the following groups may be mentioned as typical of R or R': methyl, isopropyl, phenyl, benzyl, butenyl, methylcyclopentyl, cyclohexenyl, and hydroxybutyl. In addition R' may be dodecyl, tetradecyl, hexadecyl, heptadecyl, etc.

When proceeding with our process to convert unsaturated 1,2-epoxy-3-olefin compounds to the corresponding saturated primary alcohols, such catalysts as Raney nickel, supported nickel, or other active nickel catalysts suitable for low temperature hydrogenation and as are well known to those skilled in the art may be used. Other active catalysts, such as nickel-palladium on alumina or pumice, colloidal nickel, nickel prepared from nickel carbonate, or nickel wire activated with oxygen and reduced with hydrogen, may also be used. The operating conditions, that is, temperature, pressure, contact time, etc., will depend considerably upon the particular catalyst used and the following conditions recited are not to be construed as necessarily applicable for catalysts other than the specific catalysts mentioned. In converting an unsaturated epoxy compound of the type described herein to the corresponding saturated primary alcohol over Raney nickel, suitable temperature conditions will generally fall in the range of 50 to 300° F., suitable pressures are from 10 to 75 pounds per square inch gauge, and suitable contact times are in the range of 30 minutes to 20 hours. Under certain conditions and with certain specific catalysts the above ranges of conditions may be expanded somewhat and are therefore not to be interpreted as a limitation to the overall process. When hydrogenating compounds of the type shown in Formula 2 above, it is often advisable to incorporate a solvent with the heavier members of the series to provide easier handling and more rapid reaction. Such solvents are preferably low molecular weight alcohols, dioxanes, ethers, or other solvents such as methanol, ethanol, propanol, 1,3-dioxane, 1,4-dioxane or dioxanes with realtively short hydrocarbon groups substituted thereon, diethyl ether, dimethyl ether, diiospropyl ether, dibutyl ether, and the like. Suitable quantities of hydrogen are used to saturate all of the olefinic linkages in the particular charge. For example, if the epoxide corresponding to piperylene is to be hydrogenated, theoretically two mols of hydrogen per mol of epoxide would be required to saturate the olefin bond and to convert the epoxide group to the alcohol; however, to insure a complete reaction and maximum yield it is desirable to use a slight excess of hydrogen, say 5 to 10 per cent. In addition, for every olefinic linkage which may be present in a side chain of the epoxide, another mol of hydrogen will be necessary.

Other hydrogenation catalysts may be used in the treatment of the unsaturated epoxy compounds, however, not all of these catalysts will induce complete hydrogenation. Certain catalysts, such as palladium on charcoal, will usually cause only sufficient hydrogenation to form the corresponding saturated primary aldehyde rather than the saturated primary alcohol. Generally, the formation of the saturated aldehyde will take place in the presence of a less active hydrogenation catalyst than those which form the alcohol, however, it is within the scope of my invention to reduce the activity of a catalyst which will cause complete hydrogenation of the 1,2-epoxy-3-olefin either by partially poisoning same or by reducing the temperature of the reaction zone and thus cause it to hydrogenate the epoxy-olefin to the aldehyde only. It is further within the scope of my invention to obtain both the primary saturated alcohol and the saturated aldehyde at the same time.

The attached drawing which is the plotted distillation curves of hydrogenation products of 1,2-epoxy-3-butene and 1,2-epoxybutane show clearly that to obtain only the saturated primary alcohol from the hydrogenation of an epoxide the epoxide must be unsaturated. In other words, it must be a 1,2-epoxy-3-olefin. The first curve, which is labeled "From 1,2-epoxy-3-butane," goes almost straight up until it reaches the primary butyl alcohol boiling point plateau, thus showing that only primary butyl alcohol was made. It is a curve of the boiling point of the product made in Example I. The second curve showing the boiling point curve of the hydrogenation product from 1,2-epoxy butane has two plateaus: one for secondary butyl alcohol and one for primary butyl alcohol, thus showing that the double bond between the third and fourth carbon atoms controls the way in which the epoxy ring is broken during hydrogenation. This curve is of the boiling point of the product obtained in Example II.

The following examples will disclose in more detail the advantages of our process and will serve to give specific conditions under which our process may be carried out. They will further serve to show that the process of our invention may only be carried out when the epoxide is the unsaturated derivative of a conjugated diolefin, that is, having a double bond between carbon atoms 3 and 4.

The Raney nickel catalyst used in Examples I and II was prepared by the following method. A finely ground Raney nickel alloy (NiAl$_2$) was treated with sufficient aqueous sodium hydroxide to dissolve all of the aluminum leaving a finely divided active nickel catalyst. The catalyst was then washed thoroughly and stored out of contact with air until ready for use.

Example I

Thirty-four grams of commercial 1,2-epoxy-3-butene were charged to a Parr hydrogenation apparatus along with about 15 ml. of ethyl alcohol solvent and 1.0 gram of laboratory prepared Raney nickel catalyst. Hydrogen was then introduced to the apparatus under a pressure of 40 pounds per square inch gauge. The pressure was allowed to go down to 20 p. s. i. g. due to consumption by the reaction, and was then increased to 40 p. s. i. g. by the addition of more hydrogen. By so operating an average pressure of 30 p. s. i. g. was maintained. The reactants were contacted at a temperature of 76° F. for a period of 1.5 hours, at the end of which the reaction was complete as determined by a cessation of the reduction of the hydrogen pressure. During the course of the reaction about 0.92 mol of hydrogen was consumed. After completion of the reaction, the hydrogen pressure was released and the reaction mixture separated: removing the catalyst from the solution by filtration and the solvent by stripping. The remaining material was fractionally distilled to determine the materials and quantities thereof present. The distillation shows that about 1.5 milliliters of material other than primary n-butyl alcohol were present. Twenty-six ml. of primary n-butyl alcohol were distilled off and about 4.5 ml. of primary n-butyl alcohol were recovered as kettle product. To confirm the identity of the product the alpha-naphthyl carbamide derivative was prepared. This compound had a melting point of 70 to 71° C., an index of refraction at N$_{20}^D$ of 1.3983, and a density of 0.8069 at 24.5° C.

The distillation curve of the product obtained in this example is plotted on the attached drawing.

Example II

The hydrogenation apparatus used in Example I was used in this example also, and was charged with 20 grams of 1,2-epoxybutane, about 10 ml. of ethyl alcohol solvent, and 1.0 gram of the laboratory prepared catalyst. The same catalyst and operating conditions were utilized in this example as in Example I with the exception of contact time. Apparently the hydrogenation reaction is slower in this case than when treating 1,2-epoxy-3-butene, and it was not until 16 hours of contacting had elapsed that no more hydrogen was reacted. In this reaction the hydrogen used amounted to 0.225 mol. The remaining liquid after removal of the catalyst and a portion of the solvent amounted to 25 ml. This product was fractionally distilled to determine its identity, the following data being obtained.

| Cumulative Vol. of Distillate | Temperature (°C.) | Cumulative Vol. of Distillate | Temperature (°C.) |
|---|---|---|---|
| 1 ml | 75-80 | 10 ml | 99-99 |
| 2 ml | 80-81 | 11 ml | 99-99 |
| 3 ml | 81-81 | 12 ml | 99-103 |
| 4 ml | 81-83 | 13 ml | 103-106 |
| 5 ml | 83-86 | 14 ml | 106-110 |
| 6 ml | 86-94 | 15 ml | 110-113 |
| 7 ml | 94-98 | 16 ml | 113-115 |
| 8 ml | 98-98 | 17 ml. and remainder | 116 |
| 9 ml | 98-99 | | |

The distillation curve obtained is plotted on the attached drawing.

A comparison of the distillation curves in the attached drawing show that the charge material to applicant's hydrogenation step must be the derivative of a conjugated diolefin in which the olefinic linkage between the 3 and 4 carbon atoms has not been saturated prior to hydrogenation, in order to form only the corresponding primary alcohol or aldehyde. The following two examples will further bear this out by showing that the aldehyde rather than the ketone is formed under milder hydrogenation conditions.

Example III

The apparatus of Examples I and II was also used in this example. The same conditions of operation were used except that the contact time was 3 hours rather than 1.5 hours. Commercial 1,2-epoxy-3-butene of "Technical" purity, probably produced by the chlorohydrin process, was contacted with a palladium-charcoal catalyst which is not as active a catalyst as Raney nickel. The portion of the epoxy butene hydrogenated was converted to the corresponding n-butyric aldehyde rather than the ketone.

Example IV

The same procedure used in Example III was used in this example, the only difference being that the charge stock was 1,2-epoxybutane prepared in the laboratory by the chlorohydrin process. Hydrogenation of the 1,2-epoxybutane was undetectable.

The above data show that the saturated primary alcohol (or corresponding aldehyde) may be obtained in high yield without the isomeric secondary alcohol or ketone being formed too.

The process of my invention may be carried out either batchwise as disclosed in the examples or in a continuous manner. When operating in the latter manner it is necessary to utilize equipment of sufficient size to allow ample contact time. Any conventional equipment of the desired size which will withstand the pressures used will be satisfactory. It is desirable to use apparatus equipped with means for controlling the temperature within the desired range and for providing sufficient contacting of the materials.

It is within the scope of my invention to operate with the epoxy olefin in either liquid or vapor phase, however, the former is usually preferred. Fixed catalyst bed operation is very satisfactory for the practice of our invention as is fluidized bed operation. The particular type of process utilized will depend greatly on the physical properties of the selected catalyst. If the vapor phase operation is carried out, suitable means must be used to provide adequate contacting with the catalyst. Any conventional fluidized bed apparatus which will accomplish this will suffice.

Although this process has been described and exemplified in terms of its preferred modifications, it is understood that various changes may be made without departing from the spirit and scope of the disclosure and of the claims.

We claim:

1. A process for the manufacture of at least one of the group consisting of saturated primary alcohols and the corresponding saturated aldehyes from a 1,2-epoxy-3-olefin which comprises catalytically hydrogenating said 1,2-epoxy-3-olefin.

2. A process for the manufacture of at least one of the group consisting of saturated primary alcohols and the corresponding saturated aldehydes from epoxy olefin derivatives of conjugated diolefins which comprises catalytically hydrogenating an epoxy olefin of the general formula

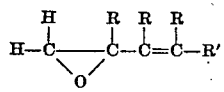

wherein each R is selected from the group consisting of hydrogen, alkyl, aryl, aralkyl, alkenyl, cycloalkyl, and cyclalkenyl containing not more than 8 carbon atoms each, wherein R' is selected from the group consisting of hydrogen, alkyl, aryl, aralkyl, alkenyl, cycloalkyl and cycloalkenyl containing not more than 20 carbon atoms, and wherein the total number of carbon atoms in the molecule does not exceed 24, and recovering from said hydrogenation a product material selected from the group consisting of saturated primary alcohols and the corresponding saturated aldehydes.

3. A process for the manufacture of a saturated primary alcohol from a corresponding 1,2-epoxy-3-olefin which comprises catalytically hydrogenating a 1,2-epoxy-3-olefin under alcohol-forming conditions and thereby obtaining the corresponding primary alcohol, and recovering said primary alcohol as a product of the process.

4. A process for the manufacture of an aldehyde from the corresponding 1,2-epoxy-3-olefin which comprises catalytically hydrogenating a 1,2-epoxy-3-olefin under aldehyde forming conditions and recovering a saturated aldehyde as a product of the process.

5. A process for the manufacture of a saturated primary alcohol from the corresponding conjugated diolefin which comprises catalytically hydrogenating an epoxy olefin of the general formula:

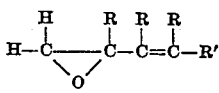

wherein each R is selected from the group consisting of hydrogen, alkyl, aryl, aralkyl, alkenyl, cycloalkyl, and cycloalkenyl containing not more than 8 carbon atoms each, wherein R' is selected from the group consisting of hydrogen, alkyl, aryl, alkenyl, cycloalkyl, and cycloalkenyl containing not more than 20 carbon atoms, and wherein the total number of carbon atoms in the molecule does not exceed 24 in the presence of a nickel catalyst and thereby producing a saturated primary alcohol derivative of the epoxy olefin.

6. A process for the manufacture of a saturated primary alcohol from the corresponding conjugated diolefin which comprises catalytically hydrogenating an epoxy olefin of the general formula:

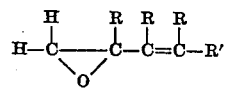

wherein each R is selected from the group consisting of hydrogen, alkyl, aryl, aralkyl, alkenyl, cycloalkyl, and cycloalkenyl containing not more than 8 carbon atoms each, wherein R' is selected from the group consisting of hydrogen, alkyl, aryl, alkenyl, cycloalkyl, and cycloalkenyl containing not more than 20 carbon atoms, and wherein the total number of carbon atoms in the molecule does not exceed 24 in the presence of a Raney nickel catalyst at a temperature in the range of room temperature to 300° F., a pressure in the range of 10 to 70 p. s. i. g., and a contact time in the range of 30 minutes to 20 hours, and in the presence of an inert solvent, and recovering from said hydrogenation the saturated primary alcohol derivative of the 1,2-epoxy-3-olefin.

7. A process according to claim 6 wherein said epoxy olefin is catalytically hydrogenated in the presence of an insert solvent selected from the group consisting of low molecular weight alcohols, dioxanes and ethers.

8. A process for manufacturing a saturated aldehyde from the corresponding conjugated diolefin which comprises catalytically hydrogenating an epoxy olefin of the general formula:

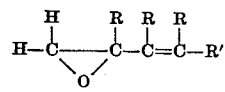

wherein each R is selected from the group consisting of hydrogen, alkyl, aryl, aralkyl, alkenyl, cycloalkyl, and cycloalkenyl containing not more than 8 carbon atoms each, wherein R' is selected from the group consisting of hydrogen, alkyl, aryl, alkenyl, cycloalkyl, and cycloalkenyl containing not more than 20 carbon atoms, and wherein the total number of carbon atoms in the molecule does not exceed 24 in the presence of a palladium catalyst and thereby producing a saturated aldehyde derivative of the 1,2-epoxy-3-olefin.

9. A process for manufacturing a saturated aldehyde from the corresponding conjugated diolefin which comprises catalytically hydrogenating an epoxy olefin of the general formula:

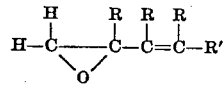

wherein each R is selected from the group consisting of hydrogen, alkyl, aryl, aralkyl, alkenyl, cycloalkyl, and cycloalkenyl containing not more than 8 carbon atoms each, wherein R' is selected from the group consisting of hydrogen, alkyl, aryl, alkenyl, cycloalkyl, and cycloalkenyl containing not more than 20 carbon atoms, and wherein the total number of carbon atoms in the molecule does not exceed 24 in the presence of a palladium-on-charcoal catalyst at a temperature in the range of 50 to 300° F. and thereby producing the saturated aldehyde derivative of the initial conjugated diolefin.

10. A process according to claim 9 wherein a solvent is used selected from the group consisting of low molecular weight alcohols, dioxanes, and ethers.

JOHN C. HILLYER.
JAMES T. EDMONDS, Jr.

REFERENCES CITED

The following references are of record in the file of this patent:

UNITED STATES PATENTS

| Number | Name | Date |
|---|---|---|
| 1,787,205 | Loehr | Dec. 30, 1930 |
| 2,042,225 | Groll et al. | May 26, 1936 |
| 2,167,203 | Guinot | July 25, 1939 |
| 2,232,910 | Green et al. | Feb. 25, 1941 |
| 2,463,850 | Brooks | Mar. 8, 1949 |

OTHER REFERENCES

Kadesch, Jour. Am. Chem. Soc., vol. 68, pages 46–48 (1946).